(12) United States Patent
Grandjean et al.

(10) Patent No.: US 12,155,101 B2
(45) Date of Patent: Nov. 26, 2024

(54) METHOD FOR PRODUCING A MEMBRANE ELECTRODE ASSEMBLY FOR A FUEL CELL

(71) Applicant: SYMBIO, Venissieux (FR)

(72) Inventors: Arnaud Grandjean, Clermont-Ferrand (FR); Benjamin Decoopman, Clermont-Ferrand (FR)

(73) Assignee: SYMBIO, Vénissieux (FR)

( * ) Notice: Subject to any disclaimer, the term of this patent is extended or adjusted under 35 U.S.C. 154(b) by 556 days.

(21) Appl. No.: 17/299,912

(22) PCT Filed: Dec. 9, 2019

(86) PCT No.: PCT/FR2019/052983
§ 371 (c)(1),
(2) Date: Jun. 4, 2021

(87) PCT Pub. No.: WO2020/115450
PCT Pub. Date: Jun. 11, 2020

(65) Prior Publication Data
US 2022/0037690 A1 Feb. 3, 2022

(30) Foreign Application Priority Data

Dec. 7, 2018 (FR) ...................................... 1872533
Feb. 1, 2019 (FR) ...................................... 1900983

(51) Int. Cl.
*H01M 8/1004* (2016.01)
*H01M 4/86* (2006.01)
(Continued)

(52) U.S. Cl.
CPC ....... *H01M 8/1004* (2013.01); *H01M 4/8807* (2013.01); *H01M 4/881* (2013.01);
(Continued)

(58) Field of Classification Search
CPC . H01M 8/1004; H01M 4/8807; H01M 4/8828
See application file for complete search history.

(56) References Cited

U.S. PATENT DOCUMENTS 10,601,053 B2    3/2020   Kunz et al.
2005/0058859 A1  3/2005   Goebel
(Continued)

FOREIGN PATENT DOCUMENTS

CN    1853298 A    10/2006
CN    101467298 A   6/2009
(Continued)

OTHER PUBLICATIONS

Search Report for French Application No. 1900983 dated Nov. 6, 2019.
(Continued)

*Primary Examiner* — Brian R OHara
(74) *Attorney, Agent, or Firm* — Pearne & Gordon LLP

(57) ABSTRACT

A method for producing a membrane electrode assembly for a fuel cell comprising a proton exchange polymer membrane, catalyst layers, and first and second gas diffusion layers, the method comprising the following steps: a) forming a catalytic layer coating on a first surface of the membrane, the opposite surface being supported by a spacer; b) forming a catalytic layer coating on a first surface of the first gas diffusion layer; c) bringing the first surface of the first gas diffusion layer into contact with the surface opposite to the said first surface of the membrane, after removing the spacer, and bringing the first surface of the membrane into contact with a surface of the second gas diffusion layer.

8 Claims, 2 Drawing Sheets

(51) Int. Cl.
*H01M 4/88* (2006.01)
*H01M 8/0273* (2016.01)
*H01M 8/10* (2016.01)

(52) U.S. Cl.
CPC ....... *H01M 4/8828* (2013.01); *H01M 8/0273* (2013.01); *H01M 2004/8689* (2013.01); *H01M 2008/1095* (2013.01)

(56) References Cited

U.S. PATENT DOCUMENTS

| | | | |
|---|---|---|---|
| 2006/0240311 A1* | 10/2006 | Dziallas | H01M 4/8605 429/534 |
| 2009/0239117 A1 | 9/2009 | Yamagata | |
| 2009/0239128 A1 | 9/2009 | Keyser et al. | |
| 2011/0097651 A1* | 4/2011 | Yim | H01M 8/1004 429/535 |
| 2015/0236360 A1 | 8/2015 | Roemer et al. | |
| 2018/0375117 A1* | 12/2018 | Grandjean | H01M 8/241 |

FOREIGN PATENT DOCUMENTS

| | | | | |
|---|---|---|---|---|
| CN | 108370045 A | | 8/2018 | |
| CN | 108777286 A | * | 11/2018 | |
| DE | 102013007204 A1 | * | 6/2014 | .......... H01M 4/8673 |
| DE | 202014004456 U1 | | 5/2015 | |
| DE | 202015104973 U1 | | 12/2016 | |
| DE | 102016000974 A1 | * | 8/2017 | .......... H01M 8/1004 |
| EP | 1387422 A1 | | 2/2004 | |
| EP | 2047553 A1 | | 4/2009 | |
| EP | 3007259 A1 | | 4/2016 | |
| WO | 2007142364 A1 | | 12/2007 | |
| WO | 2015177365 A1 | | 11/2015 | |
| WO | WO-2018115629 A1 | * | 6/2018 | .......... H01M 8/0273 |

OTHER PUBLICATIONS

Search Report for International Application No. PCT/FR2019/052983 dated Mar. 17, 2020.

* cited by examiner

METHOD FOR PRODUCING A MEMBRANE ELECTRODE ASSEMBLY FOR A FUEL CELL

This is the National Stage of PCT International Application No. PCT/FR2019/052983, filed on Dec. 9, 2019 which claims the priority of French Utility Model No. 1872533, filed on Dec. 7, 2018, and claims priority of French Application No. 1900983, filed on Feb. 1, 2019, which are incorporated herein by reference in their entirety.

The present invention relates to fuel cells, in particular but not exclusively to fuel cells of the type having an electrolyte in the form of a polymer membrane that is, the PEFC or Polymer Electrolyte Fuel Cell type).

This invention relates more particularly to methods for producing a membrane electrode assembly for a fuel cell.

Fuel cells are used as a power source in various applications, including electric vehicles. In fuel cells of the polymer electrolyte membrane type (PEFC), hydrogen is supplied to the anode of the fuel cell and oxygen is supplied as an oxidant to the cathode. Polymer membrane fuel cells (PMFCs) comprise a membrane electrode assembly (MEA) comprising an electrically non-conductive proton-exchange solid polymer electrolyte membrane having the anode catalyst on one surface and the cathode catalyst on the opposite surface. A membrane electrode assembly (MEA) is sandwiched between a pair of electrically conductive elements, called bipolar plates, by means of gas diffusion layers, made of carbon fiber, for example. The bipolar plates are generally rigid and thermally conductive. They serve primarily as current collectors for the anode and cathode and contain channels with suitable openings for distributing the gaseous reactants of the fuel cell onto the surfaces of the respective anode and cathode catalysts and for removing the water produced at the electrode. A fuel cell is thus formed by an MEA, including the gas diffusion layers, and two bipolar plates.

A fuel cell may comprise a single cell or a plurality of cells formed as a plate stack. A stack thus consists of several individual cells connected in series.

A fuel cell is powered by a fuel which is hydrogen which is supplied to the anode and by an oxidant which is oxygen or air which is supplied to the cathode.

The proton exchange membrane is in the form of a very thin film and is made, for example, of a sulfonated, perfluorinated polymer material. The anode-surface and cathode-surface catalysts comprise finely divided catalytic particles, which are typically supported by carbon particles and mixed with a proton-conducting resin, such as an ionomer or a mixture of ionomers and a solvent. The catalytic particles are usually particles of expensive precious metals, such as platinum. Thus, particular attention must be paid in the production of the membrane-electrode assemblies (MEAs), not only to take into account the high cost of these components, but also because the quality of the MEAs is directly related to the performance of a fuel cell.

Before being integrated into the membrane-electrode assembly, the catalysts are generally in the form of a liquid catalytic ink. This catalytic ink is deposited directly onto a support of the MEA assembly by spraying, screen printing, for example, or coating and spreading with a wiper. Alternatively, the catalytic ink may be deposited indirectly on a component or components of a MEA by being transferred from another ink-impregnated carrier.

Depending on the method of deposit and the recipient support for the catalytic ink within a MEA assembly, primarily two methods of obtaining such an assembly are known in the prior art.

The first method consists in coating each gas diffusion layer with catalytic ink and is known as CCB (for catalyst coated backing) and then applying them on both surfaces of a polymer membrane. The performance of a fuel cell whose MEA has been obtained by this method is generally low. In order to improve the fuel cell performance, a hot-pressing operation (at about 130° C.) is performed on the assembly for a few minutes. However, such a hot-pressing operation tends to deform or even deteriorate the membrane, which can cause a loss of the seal in the cell.

A second method, which gives better results in terms of fuel cell performance, consists of coating both surfaces of the polymer membrane with liquid catalytic ink and is known as CCM (for catalyst coated membrane). However, due to its constitution, the membrane is highly reactive to the organic or aqueous solvents that make up the catalytic ink and, as a result, it has a strong tendency to shrink and wrinkle as soon as it is brought into contact with the ink. This makes the method of applying the catalytic ink to the membrane very difficult on the one hand, and on the other hand, it requires the ink to be applied to larger areas than a flat membrane, which makes it very expensive.

To overcome this problem, a solution has been provided by document US 2011/0097651 which proposes to apply removable adhesive supports on the polymeric membrane, a support being applied on one surface of the membrane before depositing a layer of catalytic ink on the opposite surface, and then removing these supports. However, apart from the fact that it involves multiple intermediate steps that consume time and manpower, this method risks weakening the membrane and even losing part of the catalytic coating when the adhesive support with which it was in contact is removed.

EP 1387422 describes another method for applying a catalytic ink coating to a gas diffusion layer or polymer membrane of a fuel cell. This method comprises several successive steps consisting of applying, then leveling and drying the coating, each step being carried out under strict conditions of temperature, humidity and treatment time. Thus, by multiplying the steps and imposing very severe conditions on each of them, this method proves complex to implement.

One object of the invention is to remedy the disadvantages of the above-mentioned documents and to provide an original solution for a producing method of a membrane-electrode assembly (MEA) for a fuel cell.

This object is achieved by the invention, which provides a method for producing a fuel cell membrane electrode assembly comprising a proton exchange polymer membrane, catalyst layers, and first and second gas diffusion layers, the method comprising the following steps:

a) forming a catalytic layer coating on a first surface of the membrane, the opposite surface being supported by a spacer;

b) forming a catalytic layer coating on a first surface of the first gas diffusion layer; and c) bringing said first surface of the first gas diffusion layer into contact with the surface opposite said first membrane surface, after removing the spacer, and bringing said first membrane surface into contact with a surface of the second gas diffusion layer.

In other words, a good coating is already obtained on the membrane by applying the catalytic ink on one of its surfaces, corresponding to one of the electrodes, the opposite surface being supported by a spacer, thus avoiding shrinkage or deformation during deposit. A second catalytic ink deposit, corresponding to the other electrode, is made on a gas diffusion layer which is a much more rigid support and which does not deform on contact with the catalytic ink. This gas diffusion layer can be supported by a spacer. The uncovered surface of the membrane, free of its spacer, is then brought into contact with the catalytic ink coated surface of the gas diffusion layer. The assembly is closed by applying the second gas diffusion layer to the coated surface of the membrane.

Thus, it was found, during laboratory tests, that the performance of such an assembly (MEA) was very close to that of an MEA obtained by applying the coating on both membrane surfaces (which is the reference method from the point of view of the performance achieved by a fuel cell), while carrying out this assembly in an easier way and with much less material loss.

Advantageously, the coating formed in step a) corresponds to the cathode part of the membrane.

The cathode surface of the catalytic coating is the one that comes into contact with oxygen (or compressed air), it has features in terms of deposit that are directly related to the performance of the fuel cell. Thus, this coating on the cathode surface has a smaller thickness than the one on the anode surface and must be in good contact with the membrane to guarantee the performance of the cell. It is thus chosen to apply a catalytic ink coating to make the MEA cathode directly on one of the membrane surfaces. Furthermore, since the anode surface is less sensitive to contact with the membrane, the gas diffusion layer comprising the catalytic ink coating can be applied by simple pressure, without heating, thus avoiding damage to the membrane. In addition, if the coating on the gas diffusion layer is inadvertently incompliant, it can be re-deposited on a gas diffusion layer that is much less expensive than a proton exchange membrane.

In the method of the invention, the membrane and gas diffusion layers can be obtained by steps of cutting to preset dimensions before step c).

The catalytic layer coating according to the invention may be obtained by a method of direct deposit of a catalytic ink on one surface of the membrane and on one surface of the gas diffusion layer by a method from among in the group comprising screen printing, coating, flexography, spraying.

The coating deposit step according to the invention may be followed by a drying step. Drying can be done using a forced air flow heated to a temperature accepted by the membrane material, generally less than or equal to 100° C. The method of the invention may include an additional step of bonding a reinforcement having a seal to the edge of each membrane surface.

In the method of the invention, the assembly of step c) can be done by gluing.

The object of the invention is also an assembly line for implementing the method for producing a membrane electrode assembly according to the invention.

The purpose of the invention is also achieved with a fuel cell containing at least one cell comprising a membrane electrode assembly of the invention sandwiched between two bipolar plates.

The invention will be better understood from the following description, which is based on the following figures.

In the various figures, identical or similar elements bear the same reference. Their description is therefore not systematically repeated.

Figure 1:
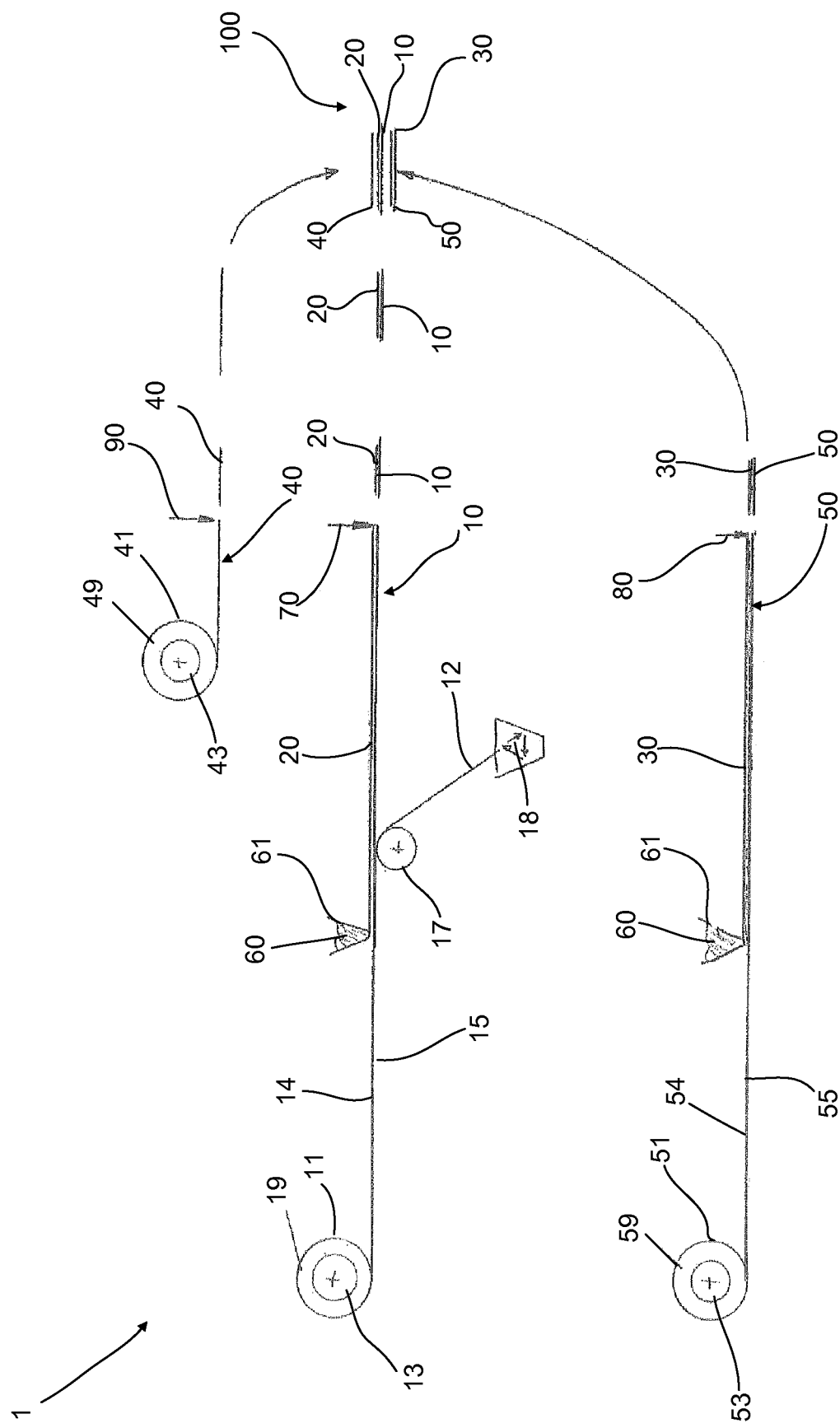
FIG. 1 is a schematic view of an assembly line that implements the method of the invention.

FIG. 1 schematically illustrates an assembly line 1 that makes it possible to obtain a membrane-electrode assembly (MEA) 100 with the method of the invention. A membrane electrode assembly 100 generally comprises a membrane 10, two catalytic layers 20, 30 forming electrodes arranged on either surface thereof, and a gas diffusion layer 40, 50 arranged opposite each electrode.

The membrane 10 is in the form of a very thin film of a proton conducting polymer called ionomer. Such an ionomer is, for example, Nafion® N117 and is supplied by its manufacturer in the form of a film roll. The film is a strip with a thickness of a few tens of μm, a width of a few tens of cm and a length of a few meters. The film is wound into a reel and supported on a spacer (or sometimes it is placed between two spacers) which can be a polyester film.

The electrodes are porous structures obtained by depositing and drying a catalytic ink on a support. The catalytic ink preferably contains particles of a catalyst of nanometric size (for example between 1 and 10 nm) supported or not by carbon particles of larger size (for example between 10 and 100 nm). The catalyst may be platinum, platinum/ruthenium or another element or group of elements selected from the platinum group of the periodic table of elements. The ink further comprises a binder, such as an ionomer (e.g., Nafion®), a solvent (e.g., water, glycerol, etc.). Additives may be added to the formulation, such as a surfactant. The ink, which is generally in a liquid state, is deposited on the substrate and dried to a catalyst loading of about 0.1 to 0.2 $mg/cm^2$.

A gas diffusion layer 40, 50 or GDL (for Gas Diffusion Layer) is a porous media to allow the transport of the reactant from its inlet to the catalyst. It must also be electrically conductive to conduct the charges. Such a gas diffusion layer is thus advantageously made of carbon fibers that are woven or knitted together or are in the form of a non-woven textile. Such a gas diffusion layer can also be treated (for example by applying to it a micro-coating made of PTFE and carbon particles) so that it is hydrophobic in order to better channel the water that results from the reaction within the cell. The gas diffusion layers used are of the type used in the manufacture of fuel cells. They are generally supplied in roll form by their manufacturer.

According to the invention, a first electrode is formed by applying a coating or catalytic layer 20 obtained from a catalytic ink 60 to a first surface 14 of the membrane 10, the opposite surface 15 being supported by a spacer 12. The first electrode or catalytic layer 20 is the one corresponding to the cathode surface of the membrane.

As best seen in FIG. 1, a roll 19 of film 11 constituting the polymeric ion exchange membrane is first unwound, the film and its support or spacer 12 being wound together around a hub 13. To unwind the film, the hub 13 is rotated about its axis, for example by means of a motor (not shown) and preferably by tensioning the film-spacer assembly. A catalytic ink deposit 60 is then applied directly to a first surface 14 of the membrane from an ink reservoir 61 by a direct deposit method, such as screen printing. The opposite surface 15 of the membrane is supported by the spacer 12 having dimensions comparable to the film forming the membrane. Other direct deposit methods, such as coating with a roller or wiper, or flexography, or even spraying can be used to apply the ink to the membrane film. An indirect deposit method, for example by pad printing using a PTFE transfer pad, can also be used.

The coating application step is followed by a drying step. This step can be done by exposing the film to ambient air for a predetermined time or by using a blown air stream, possibly heated to a temperature accepted by the membrane material, generally less than or equal to 100° C. in order to reduce the drying time of the coating.

The spacer 12 is then separated and driven by a motorized roller 18 and wound around a reel 17 for recycling.

The coated film 11 formed by the first catalytic layer 20 is fed by a transfer device, which may be a moving head comprising a bar engaging the end of the film (not shown), which moves the film until it comes to lie in the vicinity of a first cutting device 70 (which may be a knife or laser cutting device) which performs the cutting of the contour of the membrane 10.

In another embodiment, the film 11 coated in catalytic ink is wound into a spool before cutting the membrane, in which case the film is tensioned by intermediate tensioning rolls.

Figure 3:
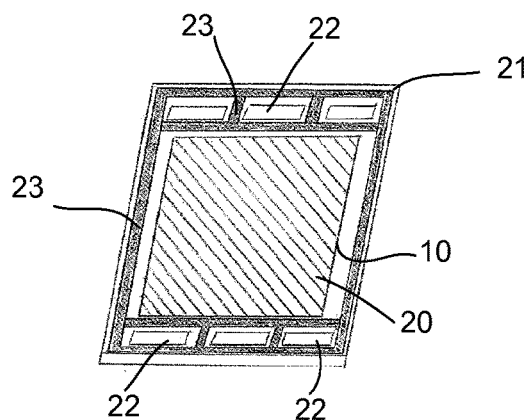
FIG. 3 is a perspective view of a portion of a membrane-electrode assembly obtained with the method of the invention.

The step of cutting the membrane 10 comprising a catalytic coating 20 one of its surfaces, forming the first electrode, is followed by an additional step of gluing a reinforcement to the edge of each of the membrane surfaces, carrying a screen-printed silicon seal. This step is best described in the applicant's WO 2017/103475. FIG. 3 schematically illustrates a sub-assembly formed by the membrane 10 covered with the catalytic layer 20 that is integral with a reinforcement 21 provided with a silicone seal 23. The reinforcement 21 comprises cut-outs 22 allowing communication through the various assemblies and a seal 23 deposited by silk-screen printing and which ensures the sealing around the perimeter of the membrane and the cut-outs of the reinforcement.

Also, according to the invention, a second electrode is formed by applying a catalytic coating or layer 30 from a catalytic ink 60 to a first surface of the first gas diffusion layer 50. The second electrode corresponds to the anode surface of the fuel cell.

As seen in FIG. 1, a roll 59 of media 51, forming a gas diffusion layer (GDL) wrapped around a hub 53, is unwound. To unwind the media, the hub 53 is rotated about its axis, for example by means of a motor (not shown) and by preferably putting the media under tension. A catalytic ink coating 60 is then applied directly to a first surface 54 of the gas diffusion layer media 51 from an ink reservoir 61 by a direct deposit method, such as screen printing. The opposite surface 55 of the media 51 is uncovered. Other direct deposit methods such as roller or doctor blade coating, or flexography, or even spraying can be used to apply ink to the gas diffusion layer (GDL). An indirect deposit method, such as pad printing using a PTFE transfer pad can also be used.

The coating application step is followed by a drying step. This step can be done by exposing the media to ambient air for a predetermined time or by using a blown air stream, possibly heated to about 100° C. to reduce the drying time of the coating.

The media 51 forming a gas diffusion layer of the roll 59 covered with the second coating layer 30 is then fed by a transfer device, which may be a moving head comprising a bar engaging the end of the media (not shown), which ensures its movement until it comes to lie in the vicinity of a second cutting device 80 (which may be a knife or laser cutting device) which performs the cutting of the contour of the gas diffusion layer 50.

In another variant, the catalytic ink coated gas diffusion layer media 51 is wound in a reel prior to cutting to the dimensions of the gas diffusion layer 50, with the media tensioning in this case being done with intermediate tensioning rolls.

A second roll 49 of GDL (gas diffusion layer) media 41 is unwound, tensioned and brought close to a third cutting device 90 which performs the contour cutting of the second gas diffusion layer 40.

The final step of the method involves the assembly of the MEA components. This is accomplished by bringing the uncovered surface of the membrane 10 into contact with the catalytic ink-covered surface forming the electrode 30 of the first gas diffusion layer 50 and the coating-covered surface forming the electrode 20 of the membrane 10 with a surface of the second gas diffusion layer 40. The assembly of all the layers can be done by bonding, for example by bonding the two gas diffusion layers 40 and 50 on either surface of the subassembly of FIG. 3. Such bonding can be done for example by hot pressing, by applying pressure to the assembly of layers and heating it at the same time.

A MEA obtained in this way is sandwiched between two bipolar plates to form an elementary cell of a fuel cell. A stack of several elementary cells can then be produced depending on the power required for the fuel cell. The stack thus obtained is then closed by end plates and connected to the various circuits that ensure the operation of the fuel cell.

Figure 2:
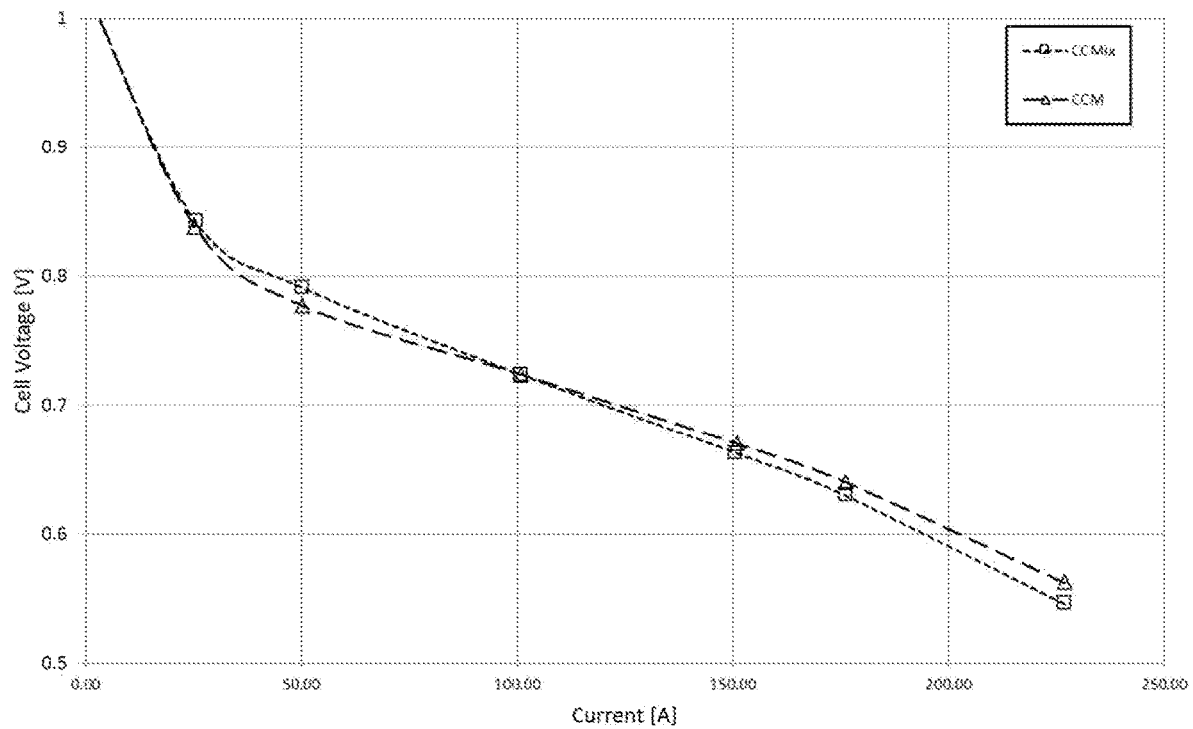
FIG. 2 is a graphical representation of the performance of a fuel cell obtained with the method of the invention compared to that of a state-of-the-art fuel cell.

The graph in FIG. 2 shows, by spaced lines (triangle-shaped marker), the performance of a state-of-the-art fuel cell in which the membrane-electrode assembly (MEA) is carried out by the CCM method deemed to give the best results. The performance of a fuel cell of the invention in which the membrane-electrode assembly was obtained with the method of the invention (CCMix in FIG. 2) is also represented on the same graph by dotted lines (square marker). Apart from the production method, the other fuel cell components are identical (including their materials, catalytic ink, etc.), as well as the stack assembly and the aging of the cells. It can be seen from this graphical representation that the performance of the two fuel cells is very close. This results in a fuel cell with good performance in operation, while using an easier producing method.

Other variants and embodiments of the invention can be envisaged without going beyond the scope of its claims. For example, the deposit of catalytic ink on the membrane or on the gas diffusion layer can be done by other methods, such as extrusion, calendaring or physical vapor deposit.

Alternatively, the method of the invention can be used to coat a previously cut membrane and gas diffusion layer (in sheet form) with a catalytic layer. In another embodiment, some components can be cut into sheets and applied to another in roll form. For example, the GDL covered with a catalytic layer and the GDL not covered with a catalytic layer can be cut into sheets and then each of them can be applied to one surface of the membrane previously covered with a catalytic layer on one of these surfaces, the membrane being in the form of a roll. In this case, the cutting of a MEA assembly will take place at the end of the assembly operation.

The invention claimed is:

1. A method for producing a membrane electrode assembly for a fuel cell comprising a polymeric proton exchange membrane, catalyst layers, and first and second gas diffusion layers, the method comprising the following steps:
   a) forming a first catalytic layer coating on a first surface of the membrane, the opposite surface being supported by a spacer, the membrane being in the form of a very thin film of a proton conducting polymer and being supplied in the form of a film roll;

b) forming a second catalytic layer coating on a first surface of the first gas diffusion layer;

c) bringing said first surface of the first gas diffusion layer with the second catalytic layer into contact with the opposite surface to the first surface of the membrane, after removing the spacer, and bringing said first membrane surface with the first catalytic layer into contact with a surface of the second gas diffusion layer, wherein the membrane and the gas diffusion layers are obtained by steps of cutting to preset dimensions prior to step c), and wherein after step b) and prior to cutting the membrane to preset dimensions, the spacer is separated from the membrane and driven by a motorized roller and wound around a reel for recycling.

2. The method according to claim 1, wherein the catalytic layer coating formed in step a) corresponds to the cathode portion of the membrane.

3. The method according to claim 1, wherein the coating of the first and second catalytic layers is obtained by a method of direct deposit of a catalytic ink on one surface of the membrane and on one surface of the gas diffusion layer by a method included in the group comprising screen printing, coating, flexography, spraying.

4. The method according to claim 3, wherein the deposit is followed by a drying step.

5. The method according to claim 1, comprising further an additional step of bonding a reinforcement to the edge of each of the membrane surfaces, carrying a seal.

6. The method according to claim 1, wherein the assembly of step c) is carried out by gluing.

7. An assembly line for carrying out the method for producing a membrane electrode assembly according to claim 1.

8. A fuel cell comprising at least one cell comprising a membrane electrode assembly obtained with the method of claim 1, the assembly being sandwiched between two bipolar plates.

* * * * *